United States Patent [19]

Kidd

[11] 4,126,986

[45] Nov. 28, 1978

[54] GRASS COLLECTION BAG FOR ROTARY LAWN MOWER

[75] Inventor: Earl H. Kidd, Galesburg, Ill.

[73] Assignee: Outboard Marine Corporation, Waukegan, Ill.

[21] Appl. No.: 743,352

[22] Filed: Nov. 19, 1976

[51] Int. Cl.$^2$ ............................................. A01D 35/22
[52] U.S. Cl. ....................................... 56/202; 56/16.6
[58] Field of Search ....................... 56/202, 255, 320.2, 56/13.4, 16.6

[56] References Cited

U.S. PATENT DOCUMENTS

| | | | |
|---|---|---|---|
| 3,118,267 | 1/1964 | Shaw | 56/17.5 |
| 3,568,421 | 3/1971 | Smith et al. | 56/255 |

*Primary Examiner*—Russell R. Kinsey
*Attorney, Agent, or Firm*—Michael, Best & Friedrich

[57] ABSTRACT

Disclosed herein is a rotary lawn mower including a blade housing, a handle extending upwardly and rearwardly from the housing for guiding mower movement, a discharge outlet located in one side of the housing, and a flexible, grass clipping collection bag which is disposed principally rearwardly of the housing and supported from the handle and from the housing. The grass clipping collection bag has front, rear, upper, bottom and opposed side walls defining a box-like interior for collecting grass clippings and a sleeve of air impervious material extending integrally from one of the side walls and terminating in a mouth which is located forwardly of the front wall and is connected in communication with the mower discharge outlet. The sleeve extends from the front wall to the rear wall and has a convexly curved outer wall portion for guiding grass clippings, being delivered through the mower discharge outlet, upwardly and rearwardly into the interior of the collection bag and in a direction generally towards the side wall opposite the sleeve.

10 Claims, 8 Drawing Figures

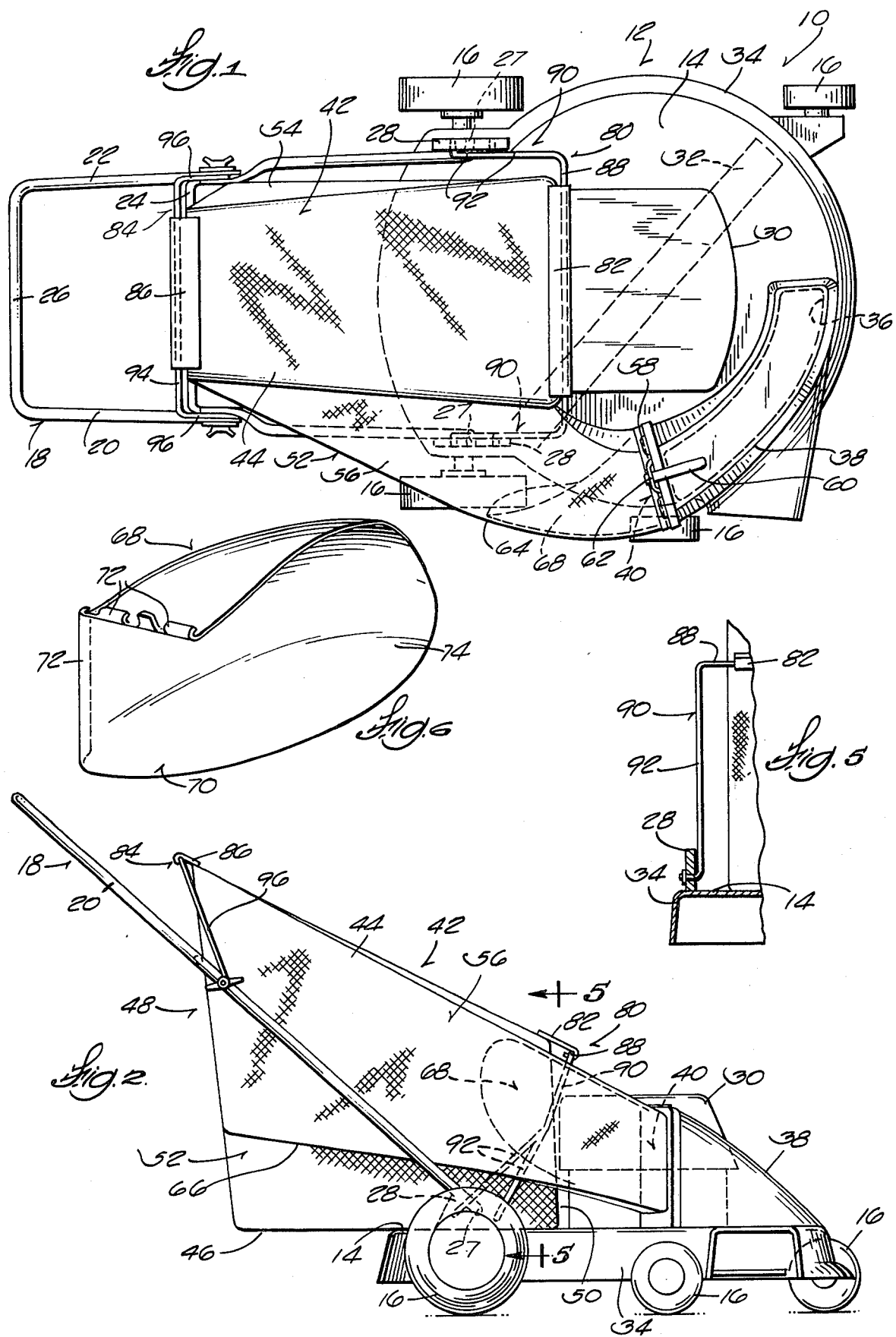

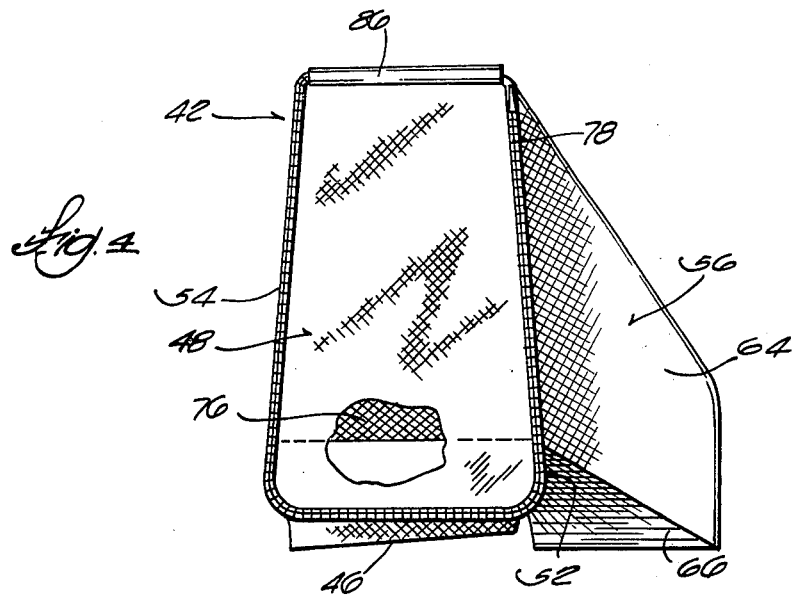
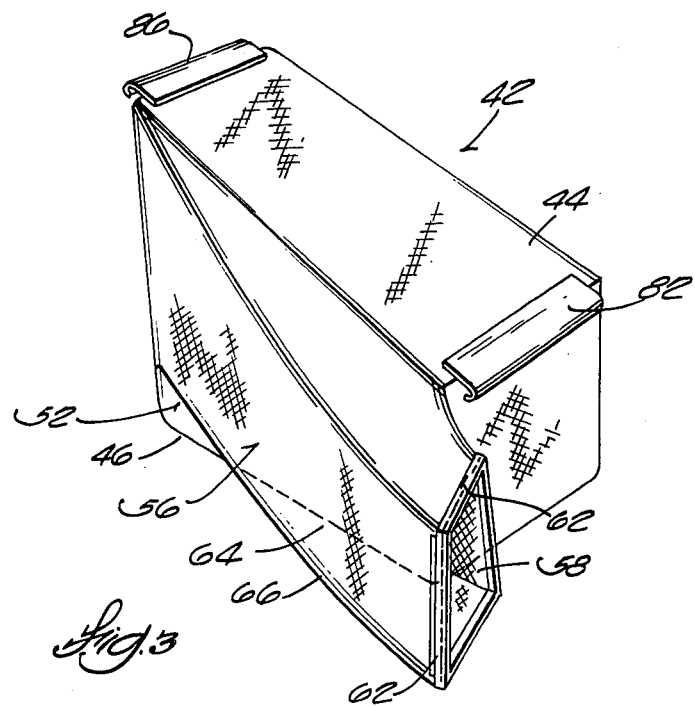

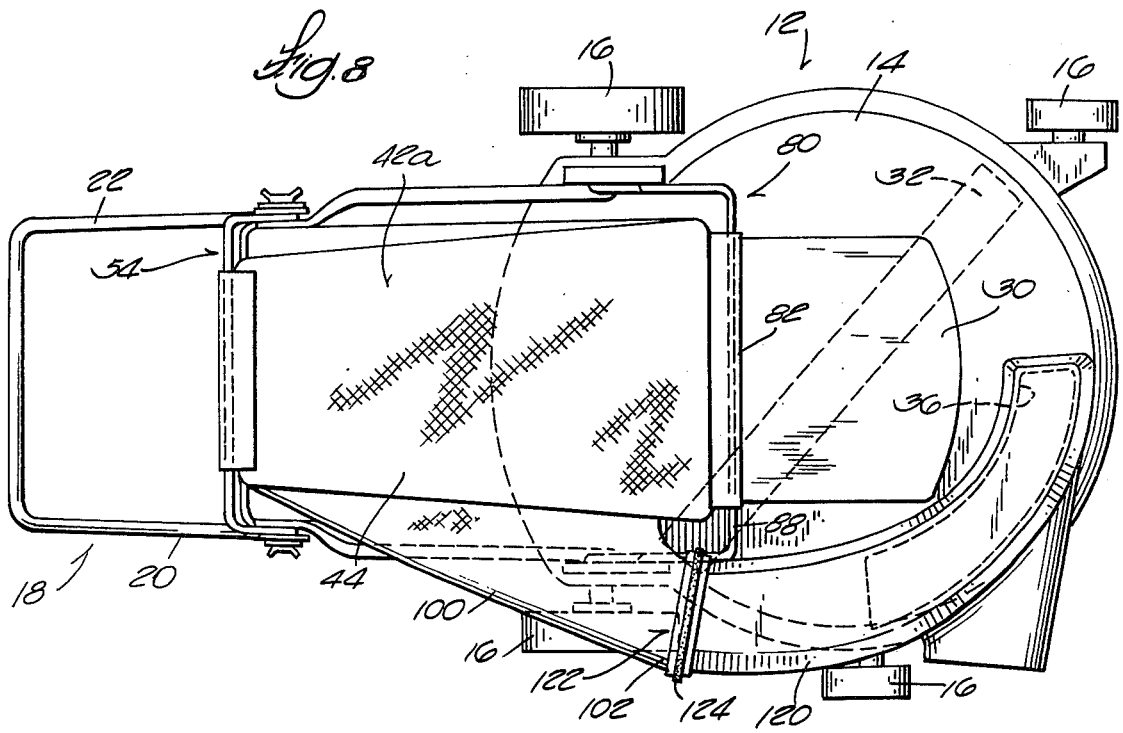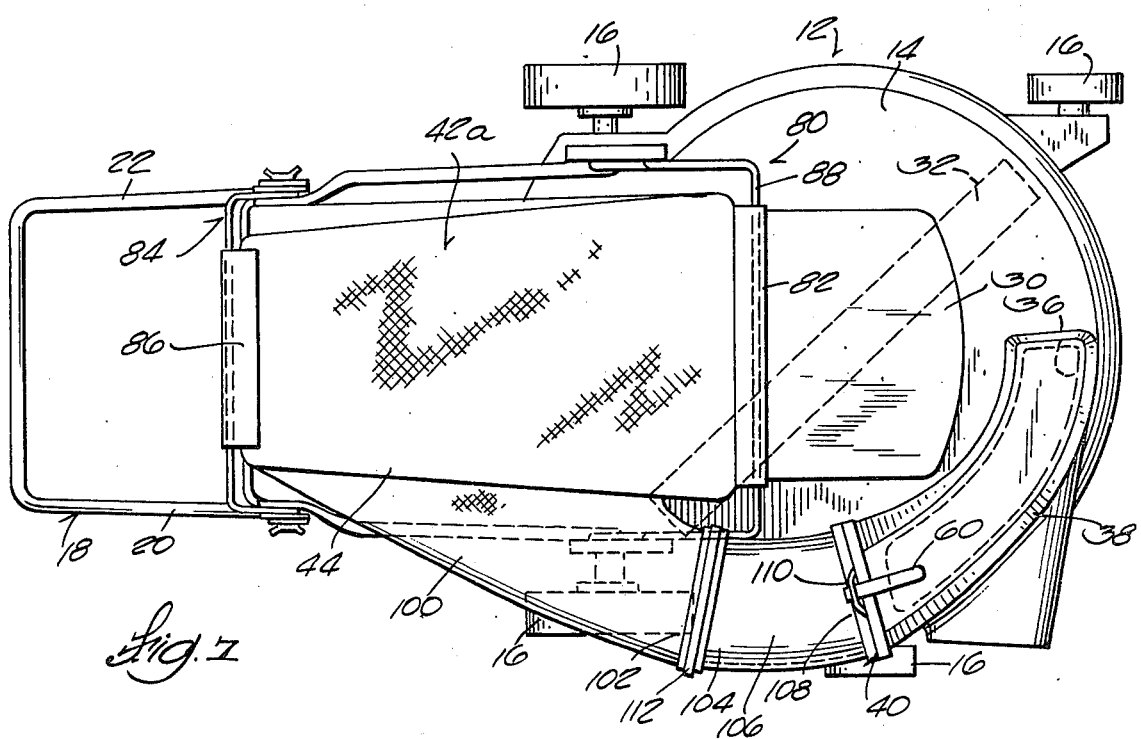

GRASS COLLECTION BAG FOR ROTARY LAWN MOWER

BACKGROUND OF THE INVENTION

The invention relates to rotary lawn mowers and, more particularly, to grass collection bags for rotary lawn mowers.

Rotary lawn mowers typically are provided with a discharge outlet which is located at one side or in the rear of the mower housing and which is adapted for the installation of a grass collection bag or receptacle. The grass clippings and other debris are discharged through the discharge outlet and into a collection bag or receptacle by a high velocity air stream created by a horizontal rotation of the cutter blade in the blade housing. The collection bag for mowers employing a side discharge typically extends some distance laterally outwardly from the mower housing with respect to the direction of mowing and prevents close mowing on the side to which it is attached.

Rear grass catching attachments for mowers having a side discharge outlet have been proposed to eliminate the above problems. Such prior attachments typically include a bag or receptacle mounted on the rear of the mower and a conduit extending from the mower side discharge outlet to the bag or receptacle. Many of such prior art attachments are not readily adaptable for installation on rotary lawn mowers of existing construction without several additional components, cannot be conveniently removed for emptying, and/or require special tools for converting the mower from a grass catching operation to one where the grass catcher is not used. Examples of prior art rear mounted grass collection attachments for rotary lawn mowers are disclosed in the following U.S. Patents:

Beal et al., U.S. Pat. No. 2,910,818 issued Nov. 3, 1959

Smith et al., U.S. Pat. No. 3,568,421, issued March 9, 1971

Gatheridge, U.S. Pat. No. 3,624,989, issued Dec. 7, 1971

Knight, U.S. Pat. No. 3,668,864, issued June 13, 1972

Corbett, U.S. Pat. No. 3,722,192, issued Mar. 27, 1973

Moery et al., U.S. Pat. No. 3,934,392, issued Jan. 27, 1976

Carpenter, 3,958,401, issued May 25, 1976

SUMMARY OF THE INVENTION

The invention provides a rotary lawn mower including a blade housing having a rear portion and side portions, a handle connected to the rear portion of the housing and extending upwardly and rearwardly therefrom for guiding the mower, a discharge outlet located at one side of the housing, a cutter blade mounted for rotary movement inside the housing for cutting grass and for delivering a stream of air with entrained grass clippings through the discharge outlet, and a bag of flexible material disposed principally rearwardly of the blade housing and including front, rear, upper, bottom, and opposed side walls defining an interior for collecting grass clippings. The collection bag includes a sleeve of air impervious material extending integrally from the side wall disposed on the same side of the housing as the discharge outlet and terminating in a mouth which is connected in communication with the discharge outlet. The sleeve has a convexly curved outer wall portion for guiding grass clippings, being delivered through the side discharge outlet, upwardly and rearwardly into the interior of the collection bag in a direction generally toward the side wall opposite the sleeve.

In further accordance with the invention, there is provided a rear frame assembly for supporting the rear portion of the collection bag from the handle and a front frame assembly supported on and extending upwardly from the blade housing for supporting the front portion of the collection bag in a manner whereby a portion of the bottom wall rests on the top deck of the housing rearwardly of the engine centrally supported on the top deck.

In still further accordance with the invention, the side discharge outlet includes a top discharge port located at one side of the housing top deck and a discharge chute disposed over the top discharge port and having a generally rearwardly facing discharge outlet. In one embodiment, the sleeve mouth is located forwardly of the front wall and is connected in direct communication with the discharge chute outlet and there preferably is provided a rigid deflector which is disposed inside the sleeve adjacent the mouth and extends along a portion of the outer wall portion of the sleeve for assisting in guiding the grass clippings in the desired direction into the interior of the collection bag. In another embodiment, there is provided a rigid, arcuately-extending chute extension which has an outlet and an inlet connected in communication with the discharge chute outlet and the collection bag sleeve mouth is releasably connected in communication with the chute extension outlet. In a further embodiment, the discharge chute outlet is located between about 4 o'clock and 5 o'clock and the mouth of the collection bag is releasably connected in direct communication with the discharge chute outlet.

One of the principal features of the invention is the provision of a rear-mounted, flexible grass clipping collection bag for rotary lawn mowers having a side discharge outlet.

Another of the principal features of the invention is the provision of such a grass clipping collection bag including a forwardly extending sleeve extending integrally from one side of the bag, which sleeve is adapted for connection in communication with the mower discharge outlet and is arranged to guide the grass clippings, being delivered through the discharge outlet, into the interior of the bag in a direction generally away from the side including the sleeve.

Still another of the principal features of the invention is the provision of such a grass clipping collection bag including means for preventing sharp objects being delivered through the discharge outlet from penetrating the sleeve.

Still another of the principal features of the invention is the provision of such a grass clipping collection bag including means for preventing sharp objects impelled by the rotating cutter blade through the discharge outlet from being delivered in a direction generally towards the operator.

Other features and advantages of the invention will become apparent to those skilled in the art upon reviewing the following detailed description, the drawings, and the appended claims.

BRIEF DESCRIPTION OF THE DRAWINGS

FIG. 1 is a top plan view of the rotary lawn mower embodying various of the features of the invention.

FIG. 2 is a side elevational view of the lawn mower shown in FIG. 1.

FIG. 3 is a perspective view of the grass collection bag installed on the lawn mower shown in FIG. 1.

FIG. 4 is a rear elevational view of the grass collection bag shown in FIG. 3.

FIG. 5 is a sectional view taken along the line 5—5 in FIG. 2.

FIG. 6 is a perspective view of a deflector installed inside a sleeve of a grass collection bag on the lawn mower shown in FIG. 1.

FIG. 7 is a top plan view of another embodiment of a rotary lawn mower embodying various of the features of the invention.

FIG. 8 is a top plan view of a further embodiment of a rotary lawn mower embodying various of the features of the invention.

Before explaining preferred embodiments of the invention in detail, it is to be understood that the invention is not limited in its application to the details of construction and the arrangements of the component set forth in the following description or illustrated in the drawing. The invention is capable of other embodiments and of being practiced and carried out in various ways. Also, it is to be understood that the phraseology and terminology employed herein is for the purposes of description and should not be regarded as limiting.

DESCRIPTION OF THE PREFERRED EMBODIMENTS

Illustrated in FIGS. 1-6 is a rotary lawn mower 10 including a blade housing 12 having a generally horizontally extending upper or top deck 14 and supported for travel along the ground by a plurality of wheels 16. Movement of the mower 10 is guided by an handle assembly 18 including a pair of laterally spaced handle bars 20 and 22 which are interconnected by cross members 24 and 26. The handle bars 20 and 22 extend rearwardly and upwardly from the blade housing 12 and the lower ends thereof are pivotally connected at 27 to upstanding ears 28 mounted on the rear of the top deck 14.

Supported generally centrally on the housing top deck 14 is a prime mover, such as an internal combustion engine 30, which is drivingly connected to and rotates a rotary cutter blade 32 disposed inside the blade housing 12 beneath the top deck 14. Depending from the top deck 14 is a generally annular, vertically extending wall 34 which surrounds the periphery of the cutter blade 32.

The blade housing 12 has a discharge outlet including an arcuately extending top discharge port 36 provided in the right side of the top deck 14 (with respect to the direction of forward mower movement as viewed in FIG. 1) and a discharge chute 38 disposed over the discharge port 36. In the specific construction illustrated, the top discharge port 36 extends from about 12 o'clock to about 3 o'clock. The discharge chute 38 can be formed as an integral or separate part of the blade housing 12 and extends upwardly and rearwardly to define a passage for the rearward discharge of grass clippings cut by the cutter blade 32. The discharge chute 38 extends from the top discharge opening, curvilinearly around the engine 30 and gradually increases in height to a discharge end including a generally rearwardly facing discharge outlet 40. In the specific construction illustrated, the discharge chute outlet 40 is located between about 2 o'clock and about 3 o'clock as viewed in FIG. 1.

While other arrangements can be used, the top discharge port 36 and the discharge chute 38 preferably are arranged in the manner described in the Shaw U.S. Pat. No. 3,118,267 which issued on Jan. 21, 1964 and is incorporated herein by reference.

The cutter blade 32 is of conventional design and includes leading cutting edges and trailing vaned edges which, upon rotation of the cutter blade, serve to assist in circulating air about the interior of the blade housing 12 so that an air stream with entrained grass clippings and/or other debris is impelled upwardly and rearwardly through the discharge chute 38 and into a collection bag 42 which is located principally between the handle bars 20 and 22 and rearwardly of the engine 30 and which is removably attached to the discharge chute 38 in a suitable manner.

As best shown in FIGS. 3 and 4, the collection bag 42 comprises a sack having a box-like shape and made from a flexible material, preferably a synthetic fabric. The sack includes a forwardly and downwardly inclined top or upper wall 44, a generally horizontally extending bottom wall 46, an upwardly and rearwardly inclined rear wall 48, a generally vertical front wall 50, a right side wall 52, and a left side wall 54 (as viewed from the rear of the mower), all of which are sewn or otherwise suitably secured together. The right side wall 52 includes an integral sleeve 56 which extends forwardly from the rear wall 48 and forwardly of the front wall 50 and terminates in a mouth 58 adapted for communication with the discharge chute outlet 40. The sleeve mouth 58 is attached to the discharge chute 38 by a releasable connection means, such as a spring latch 60 which engages a wire frame 62 surrounding the sleeve mouth 58 (FIG. 1).

The sleeve 56 serves as a transfer tube or passage for directing the stream of air and grass clippings and/or other debris exiting from the discharge chute outlet 40 into the interior of the sack, preferably in a direction generally towards the left rear corner (as viewed from the rear of the mower) so that any sharp objects, such as small stones, small pieces of glass or wire and the like, which might penetrate the collection bag 52 are directed in a direction away from the operator. Also, by directing the stream towards the left rear corner, the collection bag 42 is filled forwardly from a location farthest away from the mouth 58, thereby minimizing possible clogging of the transfer passage by accumulating grass clippings prior to the time the collection bag 42 is substantially filled.

To accomplish this desired flow from the discharge chute outlet 40 into the interior of the collection bag 42, the sleeve 56 is made from a substantially air impervious material, such as a tightly woven nylon (e.g., 200 denier), so as to minimize the loss of air pressure therethrough and to insure flow expansion or ballooning thereof by the pressurized stream. Also, the sleeve 56 preferably is arranged to form a smooth, arcuate-like extension of the discharge chute 38. As best shown in FIG. 1, the sleeve 56 has an outer wall portion 64, which is convexly curved and extends rearwardly from the mouth 58 to the back wall 48 in a curvilinear path which is generally an arcuate extension of the discharge chute 38 (FIG. 1). The sleeve 56 also has a laterally extending bottom wall portion 66 which integrally connects the outer wall portion 64 to the right side wall 52 and which, in a longitudinal direction, extends upwardly and rearwardly from the mouth 58 to the rear wall 48.

The interior surface of the sleeve 56 preferably is coated with a polyurethane composition or the like to enhance its impermeability to air and decrease friction between the internal surface of sleeve 56 and the flow of grass clippings. In accordance with a preferred embodiment, there is provided an imperforate deflector 68 which is disposed inside the sleeve 56 adjacent the mouth 58 and is arranged to assist in guiding the flow of grass clippings, exiting from the discharge chute outlet 40, in the desired direction into the interior of the collection bag 42.

More specifically, as best shown in FIGS. 1 and 6, the deflector 68 has an inlet 70 which is located adjacent the sleeve mouth 58 and has lip portions 72 arranged to fit over the wire frame 62 and a body portion 74 which extends rearwardly from the mouth 58, principally along the outer wall portion 64 of the sleeve 56, to a point rearwardly of the front wall 50. The deflector body portion 74 has a curved internal contour which is arranged to deflect or turn the air stream exiting from the discharge chute outlet 40 upwardly and rearwardly in a direction generally towards the left rear corner of the collection bag 42. The deflector 68 preferably is constructed from a relatively rigid material, such as a high impact strength plastic, so that it also can serve as an additional barrier against sharp objects penetrating the sleeve portion 56. The deflector 68 preferably is also arranged so it serves as a support means for preventing the sleeve portion 56 from collapsing when the handle 18 is pivoted about the pivot points 27, which causes a shortening of the distance between the front and rear supports for the bag and a resultant relaxation in the tautness of the bag.

In order to exhaust air from the interior of the sack during mower operation without blowing dust or the like directly onto the operator, at least one of the left side wall 54 and the top wall 44 of the collection bag 42, and preferably both, are made from an air permeable or foraminous material, such as a coarsely woven synthetic fabric (e.g., 32 × 37 mesh polyester). The front wall 50, the bottom wall 46, and the back wall 48 are made from a material (e.g., 30 × 60 mesh polypropylene) which is less air permeable than the material used for the left side wall 54 and the top wall 44, so as to minimize dust or the like being blown onto the operator. Thus, the left side wall 54 and the top wall 44 serve as the primary air flow outlets and the bottom wall 46, the back wall 48 and the front wall 58 serve as secondary air flow outlets. In the specific construction illustrated, the upper portion of the back wall 48 is lined with a relatively coarsely woven synthetic fabric 76 to provide reinforcement.

To facilitate emptying of the collection bag 42, the back wall 48 preferably is in the form of a panel or flap which is detachably fastened in a closed position by a suitable fastening means, such as a zipper 78, snaps or the like. The lower portion of the back wall 48 preferably is curved as best shown in FIG. 4 so that a single continuous zipper can be used.

Means are provided for supporting the front portion of the collection bag 42 from the blade housing 11 or the handle assembly 18 and for supporting the rear portion of the collection bag 42 from the handle assembly 18 so as to cause the upper wall 44 and the sleeve 56 to be maintained in a taut condition and so that a portion of the bottom wall 46 rests on the top deck 14 of the blade housing 12.

While various arrangements can be used, in the specific construction illustrated (FIGS. 1 and 2), the front support means comprises a front hanger or frame assembly 80 which is suitably connected to and extends upwardly from the blade housing 12 rearwardly of the engine 30 and is arranged to removably receive a front hook element 82 which extends transversely along and is sewn or otherwise suitably secured to the front upper edge of the collection bag 42. The rear support means comprises a rear hanger or frame assembly 84 which is suitably connected to and extends upwardly from the handle bars 20 and 22 rearwardly of the front frame assembly 80 and is arranged to receive a rear hook element 86 which extends transversely along and is sewn or otherwise suitably secured to the rear upper edge of the collection bag 42.

More specifically, a front frame assembly 80 has a generally inverted U-shape and includes a cross member 88 which has a circular cross section and is located above the top deck 14 and a pair of legs 90 which depend from the opposite ends of the cross member 88. Each of the legs 90 includes a pair of rearwardly diverging arms 92 which terminate in an outturned portion adapted to fit into apertures provided in the ears 28.

The rear frame assembly 84 has a generally inverted U-shape and includes a cross member 94 which has a circular cross section and is located above the handle bars 20 and 22 and a pair of legs 96 which depend from the opposite ends of the cross member 94. The lower ends of the legs 96 are fastened on the respective handle bars 20 and 22 in a suitable manner so that the distance between the cross member 94 of the rear frame assembly 84 can be adjusted to maintain the upper wall 44 and the sleeve 56 of the collection bag 42 in a taut condition.

As best shown in FIG. 2, the cross member 88 is located relative to the top deck 14 and to the engine 30 so that, when the collection bag 42 is installed, the front wall 50 is located close to the rear of the engine 30 and a front portion of the bottom wall 46 rests on the top deck 14 rearwardly of the engine 30. With this arrangement, a substantial portion of the grass clipping weight is supported on the rear portion of the top deck 14, thereby minimizing the tendency of the front wheels to be lifted off the ground by a cantilever effect imposed on the handle assembly 18 by the collection bag 42 as it becomes filled with grass clippings and/or other debris.

The collection bag 42 is installed on the mower by first slipping or twisting the rear hook element 86 over the cross member 94 of the rear frame assembly 84 then slipping or twisting the front hook element 82 over the cross member 88 of the front frame assembly 80, and finally attaching the mouth 58 of the sleeve 56 to the discharge chute outlet 40. Removal of the collection bag 42 can be accomplished by reversing this procedure.

FIGS. 7 and 8 illustrate two other embodiments of the invention including various components which are constructed and arranged in a manner similar to the embodiment illustrated in FIGS. 1–6. Thus, the same reference numerals have been assigned to common components.

In the embodiment illustrated in FIG. 7, the lawn mower is constructed in the same manner as in the embodiment illustrated in FIGS. 1–6 except the sleeve 100 of the collection bag 42a is somewhat shorter and the mouth 102 of the sleeve portion 100 is connected in communication with the outlet 104 of a hollow chute extension or adapter 106 which includes an inlet 108 suitably secured to the discharge chute outlet 40, such as by a spring latch 60 which engages a U-shaped bracket 110 provided on the adapter 106.

The adapter 106 is arranged to perform the same basic functions as the deflector 68 in the embodiment illustrated in FIGS. 1-6. Accordingly, the adapter 106 is constructed from a relatively rigid material, such as a high impact strength plastic material, and is arranged to form an arcuate extension of the discharge chute 38 so as to deflect or turn the air stream exiting from the discharge chute outlet 40 upwardly and rearwardly in a direction generally towards the left rear corner of the collection bag 42a. In the specific construction illustrated, the adapter outlet 104 is located between about 4 o'clock and 5 o'clock.

While various arrangements can be used for removably fastening the sleeve 100 of the collection bag 42a to the adapter outlet 104, in the specific construction illustrated, the sleeve mouth 102 fits over and surrounds the adapter outlet 104 and is held in place thereon by an elastic band 112 or the like. Except for a shorter sleeve 100 and the different arrangement for the mouth 102 just described, the collection bag 42a is constructed and supported from the lawn mower in the same general manner as the collection bag 42 in the embodiment illustrated in FIGS. 1-6.

In the embodiment illustrated in FIG. 8, the lawn mower is constructed in the same general manner as the embodiment illustrated in FIG. 7, except the discharge chute 38 and the adapter 106 in the embodiment illustrated in FIG. 8 is replaced by a single discharge chute 120. The discharge chute 120 includes a discharge outlet 122 and is arranged to deflect or turn the grass clippings exiting through the discharge outlet 122 upwardly and rearwardly in a direction generally towards the left rear corner of the collection bag 42a. In the specific construction illustrated, the discharge chute outlet 122 is located between about 4 o'clock and about 5 o'clock.

The collection bag 42a is constructed in the same manner as the collection bag 42a in the embodiment illustrated in FIG. 7. The mouth 102 of sleeve 100 fits over and surrounds the discharge chute outlet 122 and is removably held in place thereon by an elastic band 124 or the like.

Various of the features of the invention are set forth in the following claims.

I claim:

1. A rotary lawn mower comprising a blade housing having a rear portion, a top deck, and, at one side thereof, a discharge outlet, a handle connected to the rear portion of said housing and extending upwardly and rearwardly therefrom for guiding movement of said mower, a cutter blade mounted for rotary movement inside said housing for cutting grass and for delivering a stream of air with entrained grass clippings through said discharge outlet, a bag of flexible material disposed principally rearwardly of said blade housing and including front, rear, upper, bottom, and opposed side walls defining an interior for collecting grass clippings, said collection bag including a sleeve of air impervious material extending integrally from the one of said side walls disposed on the same side of said housing as said discharge outlet and terminating in a mouth which is connected in communication with said discharge outlet, said sleeve having convexly curved outer wall portion extending from said mouth toward said rear wall and a bottom wall portion integrally connecting said sleeve outer wall portion with said one side wall and extending in a longitudinal direction upwardly and rearwardly from said mouth toward said rear wall such that grass clippings being delivered through said discharge outlet are guided upwardly and rearwardly into the interior of said collection bag and in a direction generally towards the other of said side walls, and means for supporting said collection bag from said handle and from said housing.

2. A rotary lawn mower according to claim 1 wherein said mower includes an engine generally centrally supported on said housing top deck, and wherein said support means includes a front frame assembly supported from and extending upwardly from said blade housing rearwardly of said engine for supporting the front portion of said collection bag such that said front wall is located adjacent said engine and a portion of said bottom wall rests on said housing top deck rearwardly of said engine.

3. A rotary lawn mower according to claim 2 wherein said support means further includes a rear frame assembly spaced rearwardly from said front frame assembly for supporting the rear portion of said collection bag, said rear frame assembly being adjustably mounted on said handle whereby the longitudinal spacing between said front and rear frame assemblies can be varied so as to maintain said upper wall and said sleeve of said collection bag in a taut condition.

4. A rotary lawn mower according to claim 1 wherein said discharge outlet includes a top discharge port in said housing top deck and a discharge chute which is mounted on said housing in communication with said top discharge port and has a generally rearwardly facing discharge outlet located on one side of said housing, and wherein said sleeve mouth is releasably connected in communication with said chute discharge outlet.

5. A rotary lawn mower according to claim 4 wherein said sleeve mouth is located forwardly of said front wall.

6. A rotary lawn mower according to claim 5 wherein said collection bag includes a rigid deflector located inside said sleeve adjacent said mouth and extending rearwardly along a portion of said outer wall portion of said sleeve, said deflector having a curved interior contour for assisting in guiding the grass clippings into the interior of said collection bag.

7. A rotary lawn mower according to claim 6 wherein said chute discharge outlet is located at about 3 o'clock.

8. A rotary lawn mower according to claim 1 wherein said discharge outlet includes a top discharge port in said housing top deck and a discharge chute which is mounted on said housing in communication with said top discharge port and has a generally rearwardly facing discharge outlet located at one side of said housing, wherein said mower includes a rigid, arcuately extending chute extension having an outlet and having an inlet connected in communication with said chute discharge outlet, and wherein said sleeve mouth is releasably connected in communication with said chute extension outlet.

9. A rotary lawn mower according to claim 4 wherein said chute discharge outlet is located between about 4 o'clock and about 5 o'clock.

10. A rotary lawn mower according to claim 1 wherein at least one of said upper wall and said other side wall of said collection bag is made from an air permeable material.

* * * * *